United States Patent [19]
Wilde et al.

[11] Patent Number: 5,940,549
[45] Date of Patent: Aug. 17, 1999

[54] OPTICAL SYSTEM AND METHOD USING OPTICAL FIBERS FOR STORAGE AND RETRIEVAL OF INFORMATION

[75] Inventors: Jeffery P. Wilde, San Jose; Joseph E. Davis, Morgan Hill; Jerry E. Hurst, Jr., San Jose; John F. Heanue, Fremont; Jeff Drazan, Atherton, all of Calif.

[73] Assignee: Seagate Technology, Incorporated, Scotts Valley, Calif.

[21] Appl. No.: 08/745,095

[22] Filed: Nov. 7, 1996

Related U.S. Application Data

[60] Provisional application No. 60/025,801, Aug. 27, 1996, provisional application No. 60/023,476, Aug. 6, 1996, and provisional application No. 60/022,775, Jul. 30, 1996.

[51] Int. Cl.⁶ ............................... G02B 6/26; G02B 6/42
[52] U.S. Cl. ............................... 385/15; 385/31; 385/32; 385/16; 385/6
[58] Field of Search ............................ 385/6, 15, 16, 385/32, 130, 28, 31; 250/227.26, 216; 359/368, 385; 360/114, 59; 369/110, 112, 114, 121, 13

[56] References Cited

U.S. PATENT DOCUMENTS

| | | | |
|---|---|---|---|
| 3,737,236 | 6/1973 | Borrelli | 356/118 |
| 4,135,083 | 1/1979 | Van Alem | 250/201 |
| 4,298,245 | 11/1981 | Aulich | 350/96.29 |
| 4,337,531 | 6/1982 | Willemson | 369/45 |
| 4,449,204 | 5/1984 | Shimada et al. | 365/127 |
| 4,460,998 | 7/1984 | Yamada et al. | 371/10 |
| 4,510,544 | 4/1985 | Lazzari | 360/114 |
| 4,532,619 | 7/1985 | Sugiyama et al. | 369/106 |
| 4,539,519 | 9/1985 | Ulrich et al. | 324/117 R |
| 4,581,529 | 4/1986 | Gordon | 250/227 |
| 4,609,871 | 9/1986 | Bobb | 324/244 |
| 4,626,679 | 12/1986 | Kuwayama et al. | 250/227 |

(List continued on next page.)

FOREIGN PATENT DOCUMENTS

| | | |
|---|---|---|
| 0 279 183 A2 | 8/1988 | European Pat. Off. . |
| 0331331A2 | 2/1989 | European Pat. Off. . |
| 0650133A2 | 9/1994 | European Pat. Off. . |
| 59-117180 | 6/1984 | Japan . |
| 2016744 | 3/1979 | United Kingdom . |
| WO 95/13638 | 11/1993 | WIPO . |

OTHER PUBLICATIONS

"Integration of Deformable Mirror Devices With Optical Fiber And Waveguides," SPIE vol. 1793 Integrated Optics And Microactuators, pp. 34–39.

Laser to Fiber Coupling Module Using a MicroMachined Alignment Mirror, IEEE Photonics Technology Letters, vol. 8, No. 3, Mar. 1996.

Opsasnick, et al. "Optical Fibers for Magneto–Optical recording," SPIE vol. 1499 1991 pp. 276–280.

Renard et al, "Magneto Optical Reading an Writing Integrated Heads . . . " SPIE vol. 1499, pp. 238–247.

Barnes et al. "Use of optical fiber heads for optical disks," Applied Optics vol. 25, No. 22 Nov. 1986 pp. 4010–4012.

Opsasnick, et al. "Optical Fibers for Magneto–Optical Recording," SPIE vol. 1499 1991 pp. 238–246.

(List continued on next page.)

Primary Examiner—Phan T. H. Palmer
Attorney, Agent, or Firm—Fenwick & West LLP; Mark A. Wardas

[57] ABSTRACT

An optical system and method for selective transmission of light between a source of light and a set of storage disks along an optical path that includes at least one individual optical fiber. In an optical system and method that uses a magneto-optical storage medium, single-mode polarization maintaining optical fibers and a compensator may be included. Alternatively, the optical system and method may include an optical switch.

38 Claims, 7 Drawing Sheets

U.S. PATENT DOCUMENTS

| | | | |
|---|---|---|---|
| 4,683,421 | 7/1987 | Miller et al. | 324/96 |
| 4,740,951 | 4/1988 | Lizet et al. | 370/3 |
| 4,796,226 | 1/1989 | Valette | 365/122 |
| 4,799,210 | 1/1989 | Wilson et al. | 369/110 |
| 4,806,885 | 2/1989 | Morimoto | 332/7.51 |
| 4,847,823 | 7/1989 | Lindow | 369/110 |
| 4,866,372 | 9/1989 | Aoshima et al. | 324/96 |
| 4,945,400 | 7/1990 | Bloder et al. | 357/74 |
| 5,029,023 | 7/1991 | Bearden et al. | 369/69 |
| 5,033,043 | 7/1991 | Hayakawa | 369/121 |
| 5,034,679 | 7/1991 | Henderson et al. | 324/96 |
| 5,039,220 | 8/1991 | Arditty et al. | 356/345 |
| 5,111,326 | 5/1992 | Ball | 359/244 |
| 5,119,361 | 6/1992 | Tanabe | 369/121 |
| 5,135,295 | 8/1992 | Jen et al. | 385/13 |
| 5,137,359 | 8/1992 | Steele | 356/350 |
| 5,152,597 | 10/1992 | Barnard | 359/130 |
| 5,161,133 | 11/1992 | Levenson | 369/13 |
| 5,191,387 | 3/1993 | Ichikawa | 356/34 |
| 5,212,583 | 5/1993 | Vali et al. | 359/245 |
| 5,218,582 | 6/1993 | Marchant | 369/14 |
| 5,229,834 | 7/1993 | Lequime | 356/365 |
| 5,233,444 | 8/1993 | Musha et al. | 359/15 |
| 5,245,491 | 9/1993 | Horie et al. | 360/114 |
| 5,272,330 | 12/1993 | Betzig et al. | 250/216 |
| 5,278,812 | 1/1994 | Adar et al. | 369/44 |
| 5,288,997 | 2/1994 | Betzig et al. | 250/227.26 |
| 5,289,454 | 2/1994 | Mohapatra et al. | 369/112 |
| 5,311,360 | 5/1994 | Bloom et al. | 359/572 |
| 5,323,373 | 6/1994 | Horimai | 369/110 |
| 5,325,116 | 6/1994 | Sampsell | 346/108 |
| 5,383,048 | 1/1995 | Seaver | 359/279 |
| 5,446,574 | 8/1995 | Djupsjobacak | 359/181 |
| 5,448,548 | 9/1995 | Taneya et al. | 369/121 |
| 5,477,323 | 12/1995 | Andrews et al. | 356/345 |
| 5,483,607 | 1/1996 | O'Keefe | 385/11 |
| 5,493,220 | 2/1996 | Oliver et al. | 324/209 |
| 5,495,456 | 2/1996 | Oka et al. | 369/13 |
| 5,495,484 | 2/1996 | Fujikawa et al. | 369/121 |
| 5,521,999 | 5/1996 | Chuang et al. | 385/88 |
| 5,536,926 | 7/1996 | Ikeda et al. | 235/462 |
| 5,625,483 | 4/1997 | Swartz | 359/224 |
| 5,625,725 | 4/1997 | Nakano et al. | 385/14 |
| 5,633,959 | 5/1997 | Nike | 385/11 |
| 5,742,419 | 4/1998 | Dikensheets | 359/201 |

OTHER PUBLICATIONS

Garvey, et al. "Single–Mode Nonlinear–Optical Polymer Fibers" J. Optical Society Am. B. vol. 13 No. 9 Sep. 1996, pp .2017–2023.

K.S. Lan, Engineering Laboratory Notes insert to Aug. 1996 Issue of Optics and Photonics News (OPN) "An economical piezoelctic phase modulator for fiber optic sensors".

Patent Abstracts of Japan Publication No. 08129776 May 1996.

Patent Abstracts of Japan Publication No. 08297883 Nov. 1996.

Patent Abstracts of Japan Publication No. 07235095 Sep. 1995.

Patent Abstracts of Japan Publication No. 09044922 Jul. 1995.

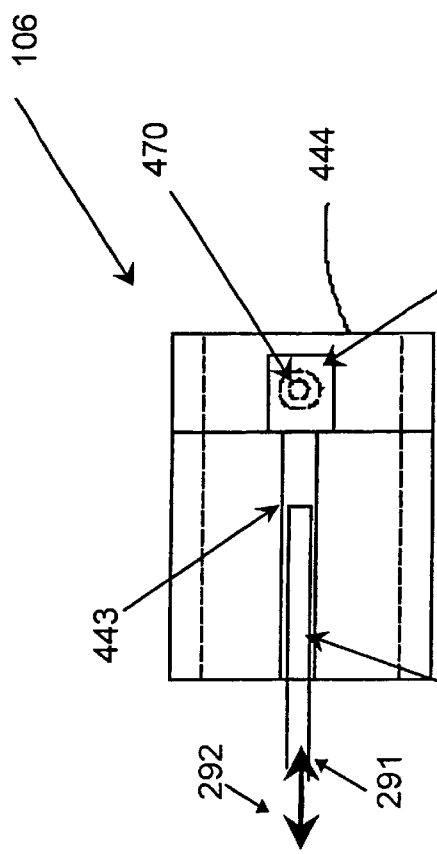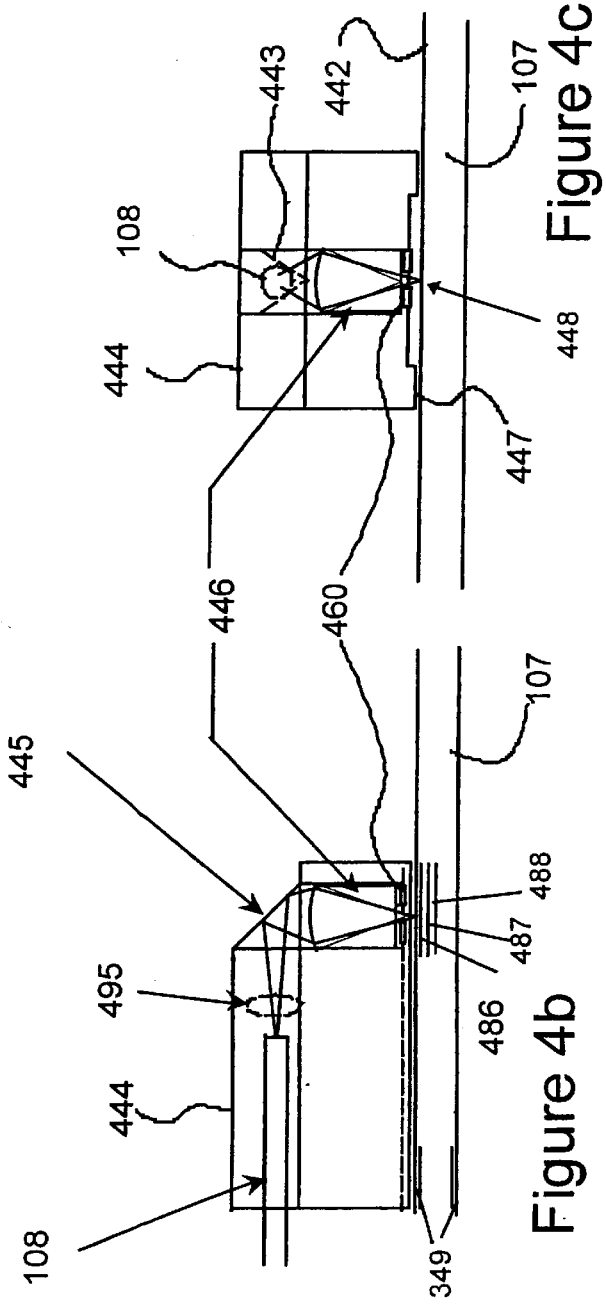

OPTICAL SYSTEM AND METHOD USING OPTICAL FIBERS FOR STORAGE AND RETRIEVAL OF INFORMATION

CROSS REFERENCE TO RELATED APPLICATIONS

This application claims benefit of: Provisional Application Ser. No. 60/022,775, entitled "A Data Storage And Retrieval System Based On A Flying Magneto-Optical Head," filed on Jul. 30, 1996; Provisional Application Ser. No. 60/023,476, entitled "A Data Storage And Retrieval System Based On A Flying Magneto-Optical Head," filed on Aug. 6, 1996; and Provisional Application Ser. No. 60/025,801, entitled "A Data Storage And Retrieval System Based On A Flying Magneto-Optical Head," filed on Aug. 27, 1996. The present application further relates to U.S. patent application Ser. No. 08/731,214 entitled "Flying Optical Head With Dynamic Mirror" on Oct. 10, 1996. The subject matter of each of these related applications is incorporated herein by reference. All related applications are commonly assigned.

BACKGROUND OF THE INVENTION

1. Field of the Invention

The present invention relates generally to the use of optical fibers in data storage and retrieval systems and more particularly to the use of single-mode polarization maintaining optical fibers in magneto-optical data storage and retrieval systems.

2. Background Art

In today's technological society, as the amount of information continues to grow, storage and retrieval of the information will play an increasingly important role. In a particular information storage technology known as magneto-optical (MO) data storage and retrieval, a long term goal continues to be improved access to this information. Information access includes the use of a polarized laser light source for reading and/or writing information at a mark of interest on an MO disk. In the case of reading information, MO technology makes use of a magneto-optical effect ("Kerr" effect) to detect a polarization rotation imposed on a linearly polarized incident laser beam by a surface recording layer at the mark of interest. The polarization rotation (representing the information stored at the mark of interest) is embodied in a reflection of the linearly polarized laser beam and is converted by electronics for readout. Consequently, to accurately read stored information from an MO disk, the polarization orientation of the reflected laser beam should be faithfully conveyed from the MO disk to the readout electronics.

In one prior art proposal, S. Renard and S. Vallette (SPIE Vol. 1499, Optical Data Storage 1991, pp. 238–247) disclose an MO head design that requires three optical fibers to read and write information. Renard's MO head design is made undesirably complex, primarily, because of the large number of optical and compensating elements used in its implementation.

An alternative approach uses three polarization maintaining (PM) optical fibers. In this approach, the intrinsic properties of the fiber can be made to preserve the optical polarization as required for MO recording. Because PM optical fiber generally exhibits birefringence, (i.e., a different refractive index that different polarization orientations experience), external stresses or temperature variations may function to induce unwanted phase fluctuations between the two polarization modes of the PM optical fiber. Consequently, any information conveyed by the polarization rotation as it propagates through the PM optical fiber may also be affected. A proposal for passively eliminating phase fluctuations caused by the properties of PM optical fiber is discussed by M. N. Opsasnick in SPIE Vol. 1499, Optical Data Storage 1991, pp. 276–278. As in the design of Renard and Vallette, the Opsasnick MO head and actuator arm design is limited by its physical size, mass, and the number of optical elements required. In general, the greater the number and mass of the optical elements used to access information in an MO data storage and retrieval system, the slower the speed at which the information may be accessed, the lower the tracking bandwidth becomes, and the lower the track density that may be read or written.

A third approach to data storage based on flying head optical technology with free-space optical propagation to and from the head is proposed by N. Yamada (U.S. Pat. No. 5,255,260). In particular, Yamada discloses an optical head arrangement that requires one stationary laser/detector package per head, with the head placed on a linear actuator for movement across a disk surface. Yamada does not address the problems associated with vertical runout of the disk or the associated degradation of the optical spot size. Although Yamada provides access to a plurality of phase change optical disks, the number of optical disks that may be operated within a given volume, as well as the performance characteristics associated with the optical disks, is inherently limited by the excessive number, size, and cost of the required optical and mechanical components.

What is needed is an optical system and method that improves upon the prior art efforts directed towards data access. Compared to the prior art, the optical system and method should preferably reduce head weight and size, improve disk access time, require fewer optical components, increase the number of storage disks that may be operated within a given volume, and be inexpensive and easy to manufacture.

SUMMARY OF THE INVENTION

The present invention provides an apparatus and method for conveyance of optical information between a source of polarized laser light and a storage location. As compared to the prior art, the present invention reduces head weight and size, provides a set of low profile optical paths, improves information access times, requires fewer optical components, and increases the storage capacity available within a given volume.

The present invention conveys information along an optical path that includes a first optical fiber located between the source of polarized laser light and a selected storage location. Alternatively, the present invention selectively conveys information along an optical path selected from a set of optical paths that includes the first optical fiber and a set of second optical fibers. In the preferred embodiment, the optical paths are confocal optical paths, the storage location includes a set of magneto-optical storage disks, and the optical fibers are single-mode polarization maintaining optical fibers. In the preferred embodiment, each of the optical paths are coupled along a respective positioning arm to a respective flying magneto-optical head. In the preferred embodiment, the respective positioning arms are rotary actuator arms. In the preferred embodiment, each of the optical paths is positioned by its respective rotary actuator arm so as to selectively access a reflection of the source of polarized light from a selected magneto-optical disk. The set of optical paths may further include an optical switch that selectively routes information between the source of polarized laser light and the set of magneto-optical storage disks.

In an embodiment that uses single-mode polarization maintaining optical fibers, a phase compensator is coupled to the optical paths so as to dynamically compensate for fluctuations that arise in the relative phase between the two orthogonal polarization components of the single-mode polarization maintaining optical fibers. In the preferred embodiment, the phase compensator is located other than on the magneto-optical heads so as not to increase their size or mass. In one embodiment, the phase compensator is a piezo-electric compensator that slightly stretches the optical fiber. In an alternative embodiment, the phase compensator is an electro-optical material.

BRIEF DESCRIPTION OF THE DRAWINGS

FIGS. 4a–c are diagrams showing the flying magneto-optical head of the magneto-optical data storage and retrieval system of FIG. 1 in a top view, a cross-sectional side view, and a front view, respectively;

DETAILED DESCRIPTION OF THE PREFERRED EMBODIMENTS

Figure 1:
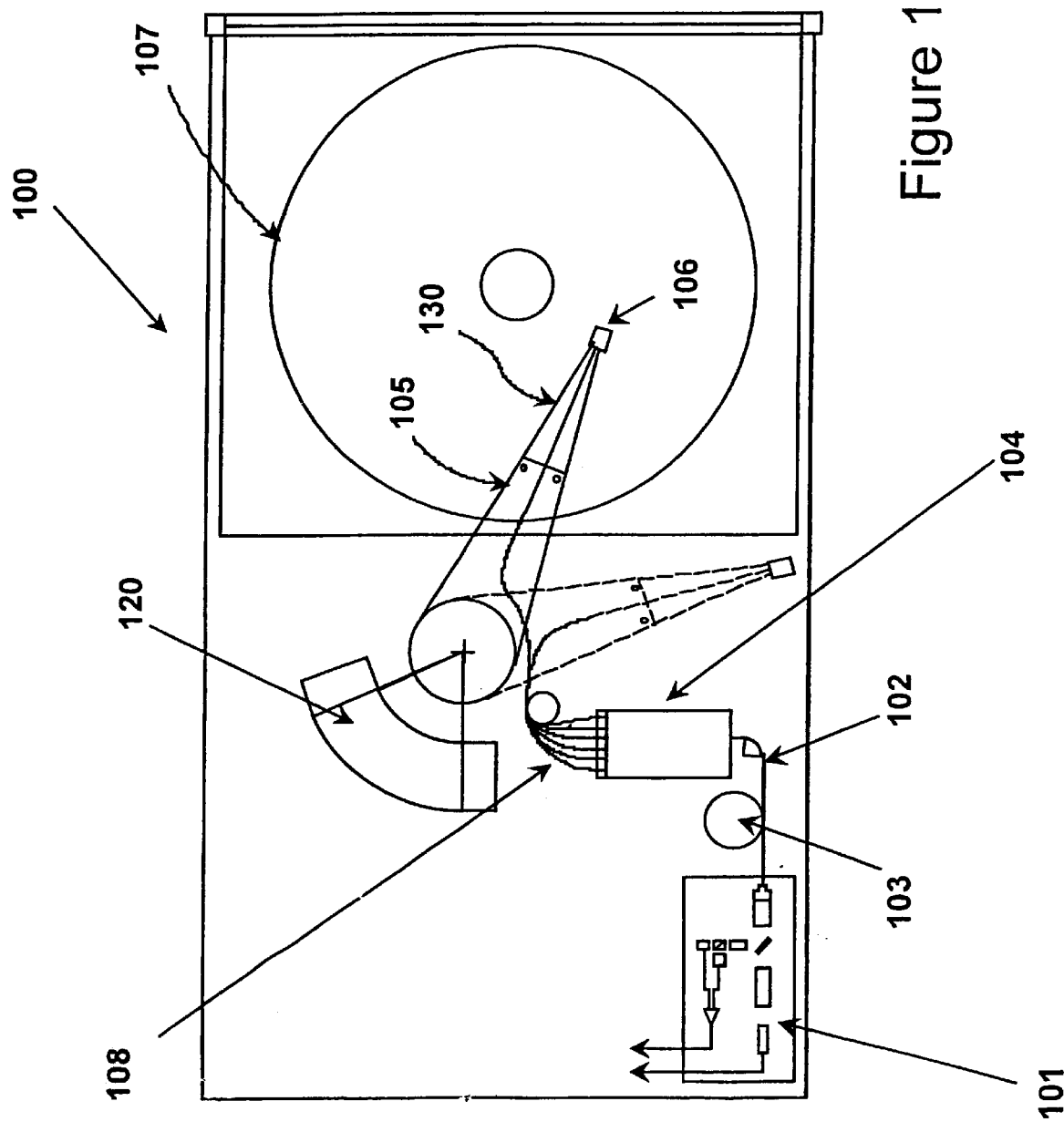
FIG. 1 is a diagram showing a magneto-optical data storage and retrieval system.

FIG. 1 is a diagram showing a magneto-optical data storage and retrieval system. In a preferred embodiment, magneto-optical (MO) data storage and retrieval system 100 includes a set of Winchester-type flying heads 106 that are adapted for use with a set of spinning MO disks 107 (one head for each MO disk surface). The set of flying heads 106 (hereinafter referred to as MO heads) are coupled to a rotary actuator magnet and coil assembly 120 by a respective suspension 130 and actuator arm 105 for positioning the set of MO heads 106 over the surfaces of the set of spinning MO disks 107. In operation, lift forces are generated by aerodynamic interactions between the set of MO heads 106 and the spinning MO disks 107. The lift forces are opposed by equal and opposite spring forces applied by the set of suspensions 130. In the preferred embodiment, the set of MO heads 106 are maintained at a predetermined flying height within a spacing in a range of 125 to 500 nm over a full radial stroke of the rotary actuator assembly 120 above and below both surfaces of the set of spinning MO disks 107. In the preferred embodiment, system 100 is designed in such a way that under normal operating conditions the set of MO heads 106 never directly contact the set of spinning MO disks 107.

System 100 further includes: a laser-optics assembly 101, a single-mode polarization maintaining (PM) optical fiber 102, a phase compensator 103, an optical switch 104, and a set of single-mode PM optical fibers 108. In the preferred embodiment, each of the set of single-mode PM optical fibers 108 are respectively coupled with the set of actuator arms 105 and the set of suspensions 130, ending in a respective connection at a respective one of the set of MO heads 106. As will be discussed shortly, PM optical fibers 102 and 108 provide a set of low-profile and low-mass optical paths that improve the data storage capacity per unit volume of system 100 as compared to the prior art, while maintaining fast seek and data transfer rates.

Figure 2:
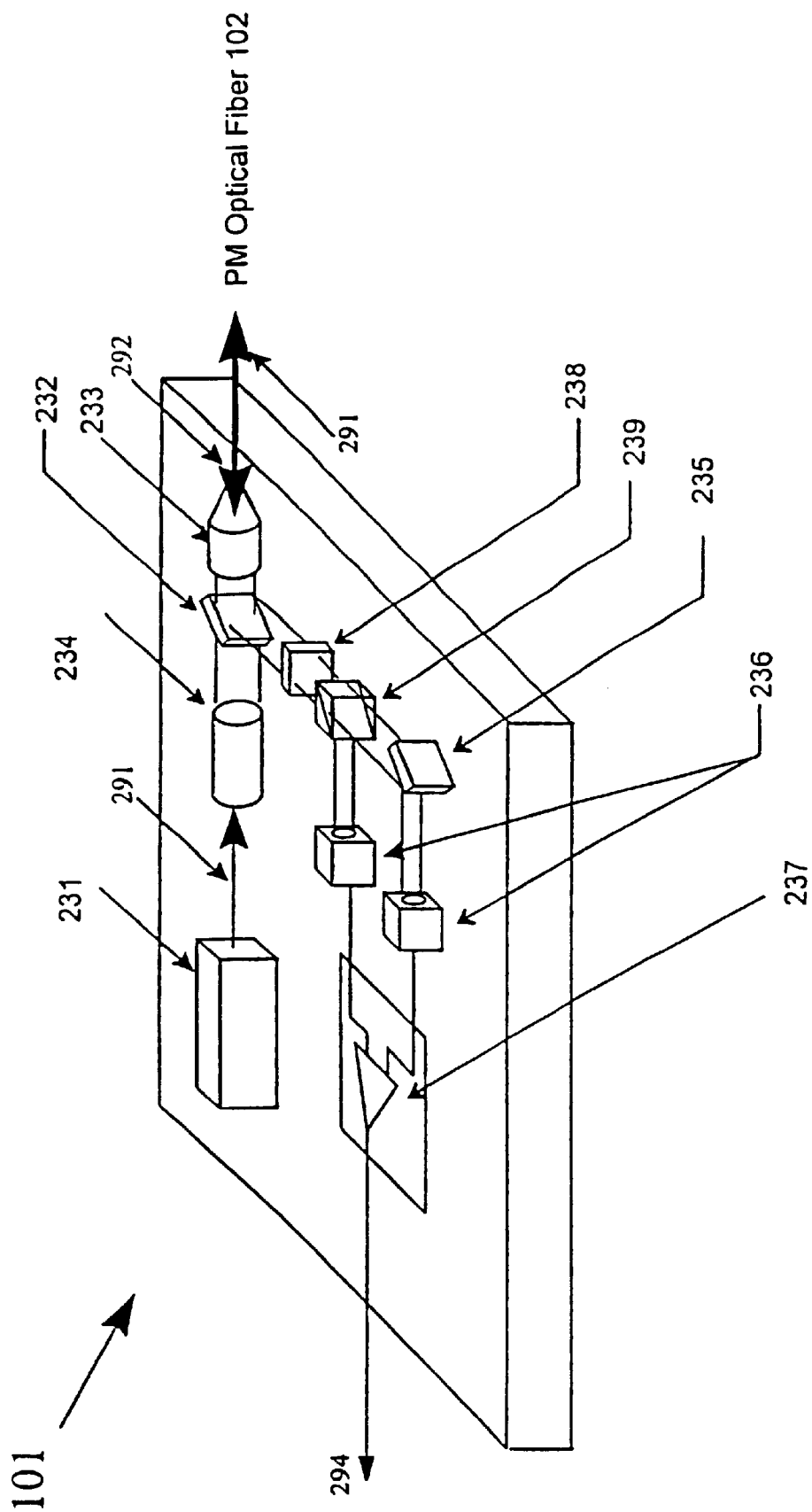
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized laser source 231 operating in a visible or near ultraviolet region and emitting an optical power in the range from 30 to 50 mw. Laser-optics assembly 101 further includes: collimating optics 234, a low dispersion leaky beam splitter 232, and a coupling lens 233. In the preferred embodiment, laser-optics assembly 101 directs a linearly polarized outgoing laser beam 291 from the linearly polarized laser source 231 into a proximal end of a single-mode PM optical fiber 102 for delivery of the outgoing laser beam 291 to a selected one of the set of spinning MO disks 107. Laser-optics assembly 101 further includes: a ½ wave plate 238, a mirror 235, and a polarizing beam splitter 239. In the preferred embodiment, a reflected laser beam 292 from the spinning MO disk 107 exits the single-mode PM optical fiber 102 at the proximal end, is collimated by the coupling lens 233, and is routed by the leaky beam splitter 232 to a differential detector comprising: the ½ wave plate 238, the mirror 235, and the polarizing beam splitter 239. As is well established in the art, this type of differential detection scheme measures the optical power in the two orthogonal polarization components of the reflected laser beam 292, with the differential signal being a sensitive measure of polarization rotation induced by the Kerr effect at the surface of a spinning MO disk at readout. In the preferred embodiment, after conversion by a set of photodiodes 236 and a differential amplifier 237, the differential signal is output as signal 294. While the preferred embodiment includes one well known arrangement of optical components embodied as the laser-optics assembly 101, those skilled in the art will recognize that the present invention is not meant to be limited to this arrangement, as other techniques for directing the linearly polarized outgoing laser beam 291 and for detecting the linearly polarized reflected laser beam 292 are well known in the art.

Figure 3:
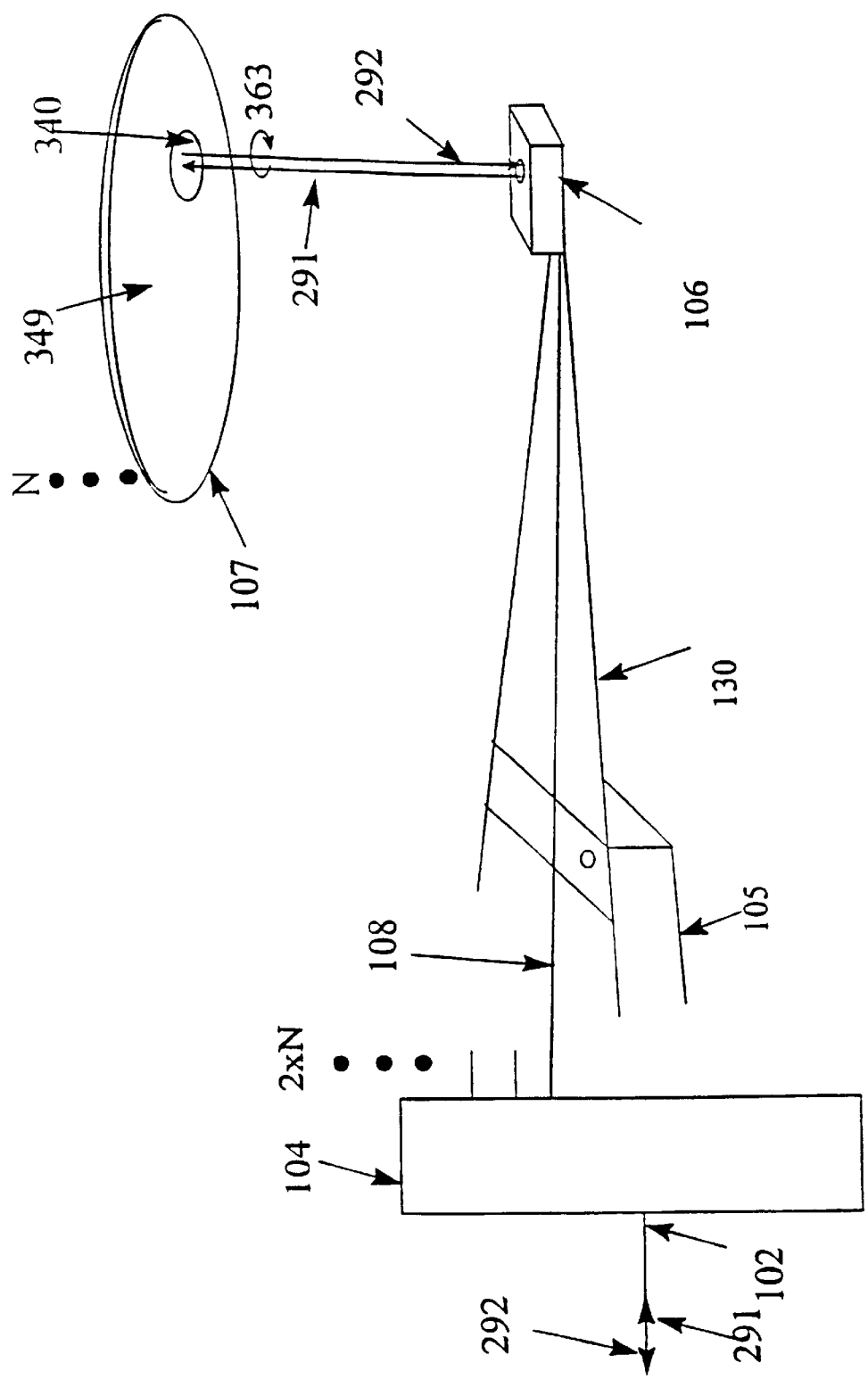
FIG. 3 is a diagram showing an optical path that includes the optical fiber and the optical switch of the magneto-optical data storage and retrieval system of FIG. 1.

FIG. 3 is a diagram showing an optical path that includes the optical fiber and the optical switch of the magneto-optical data storage and retrieval system of FIG. 1. Those skilled in the art will recognize that the set of optical paths of the present invention may be described with reference to a single optical path, shown in FIG. 3 to include: the single-mode PM optical fiber 102, the optical switch 104, one of the set of single-mode PM optical fibers 108, and one of the set of MO heads 106. In the preferred embodiment, the outgoing linearly polarized laser beam 291 from the laser-optics assembly 101 propagates from the proximal end of the single-mode PM optical fiber 102 and is selectively routed by the optical switch 104 to enter a respective proximal end of the single-mode PM optical fiber 108. The outgoing linearly polarized laser beam 291 is further directed to exit a respective distal end of the single-mode PM optical fiber 108 for transmission through the MO head 106 to a surface recording layer 349 of the respective spinning MO disk 107. In the preferred embodiment, optical switch 104 provides sufficient degrees of selectivity for directing laser beams 291 and 292 between the single-mode PM optical fiber 102 and the set of single-mode PM optical fibers 108. Those skilled in the art will recognize that optical switch 104 may be implemented using micro-mechanical, electro-optical, and/or thermo-optical technologies.

During writing of information, the linearly polarized outgoing laser beam 291 is selectively routed by the optical switch 104 to the spinning MO disk 107 so as to lower a coercivity of the surface recording layer 349 by heating a selected spot of interest 340, preferably in a range from 150 to 250 degrees Centigrade depending on the Curie point of the MO recording layer 349. In the preferred embodiment, the optical intensity of linearly polarized outgoing laser beam 291 is held constant, while a time varying vertical bias magnetic field is used to define a pattern of "up" or "down" magnetic domains perpendicular to the spinning MO disk 107. This technique is known as magnetic field modulation (MFM). Alternatively, outgoing laser beam 291 may be modulated in synchronization with the time varying vertical bias magnetic field at the spot of interest 340 in order to better control domain wall locations and reduce jitter. Subsequently, as the selected spot of interest 340 cools at the surface layer 349, information is encoded at the surface of the respective spinning disk 107 as a pattern of "up or down" magnetic domain polarities.

During readout of information, the linearly polarized outgoing laser beam 291 (at a lower intensity compared to writing) is selectively routed to the respective spinning MO disk 107, such that, at any given spot of interest 340 the Kerr effect causes (upon reflection from the surface layer 349) the outgoing laser beam 291 to have rotated linear polarization of either clockwise or counter clockwise sense (shown as rotation 363) depending on the magnetic domain polarity at the spot of interest 340.

The aforementioned optical path is bi-directional in nature. Accordingly, the reflected laser beam 292 received through the MO head 106, enters the distal end of the single-mode PM optical fiber 108, propagates along the single-mode PM optical fiber 108 to exit at its proximal end, is selectively routed by the optical switch 104 to enter the distal end of the single-mode PM optical fiber 102, and propagates along the single-mode PM optical fiber 102 to exit at its proximal end for subsequent conversion as signal 294.

FIGS. 4a–c are diagrams showing the flying magneto-optical head of the magneto-optical data storage and retrieval system of FIG. 1 in a top view, a cross-section side view, and a front view, respectively. Those skilled in the art will recognize that the set of flying MO heads of the present invention may be illustrated by reference to a single representative MO head 106, which is shown in FIG. 4a–c to be positioned respectively above or below a surface recording layer 349 of one of the set of spinning MO disks 107. In the preferred embodiment, the MO head 106 includes: a slider body 444, an air bearing surface 447, a reflective surface 445, objective optics 446, and a magnetic coil 460. In the preferred embodiment, the slider body 444 is dimensioned according to mechanical and optical constraints that include: physical size, numerical aperture (NA), and working distances between the objective optics 446, the single-mode PM optical fiber 108, and the reflective surface 445. In the preferred embodiment, reflective surface 445 may include a right angle prism, or in an alternative embodiment, a mirror as disclosed in commonly assigned U.S. patent application Ser. No. 08/731,214, entitled "Fying Optical Head With Dynamic Mirror" filed on Oct. 10, 1996, and which is incorporated herein by reference. While, slider body 444 may include an industry standard "mini", "micro", "nano", or "pico" slider, which may have respective heights of 889 um, 610 um, 432 um, or 105 um, those skilled in the art will recognize that, as determined by the aforementioned mechanical and optical constraints, alternatively dimensioned slider bodies 444 may also be used. Accordingly, in an preferred embodiment, slider body 444 has a slider height of approximately 889 um and a planar footprint area that corresponds to that of a nano slider.

In the preferred embodiment, single-mode PM optical fiber 108 is coupled to the MO head 106 and is held central to an axis of the slider body 444 by a v-groove 443. In the preferred embodiment, a linearly polarized outgoing laser beam 291 exits the single-mode PM optical fiber 108 and is directed by the reflective surface 445 (at an angle of approximately ninety degrees to the axis of the single-mode PM optical fiber 108) through the objective optics 446 onto a surface recording layer 349 of the spinning MO disk 107 as a focused optical spot 448. In the preferred embodiment, the single-mode PM optical fiber 108 is positioned within the v-groove 443 to preferably locate the focal point of the focused optical spot 448 for optimum focus. The single-mode PM optical fiber 108 may be subsequently secured in place by using ultraviolet curing epoxy or similar adhesive. In the preferred embodiment, reflective surface 445 and objective optics 446 are sufficiently compact and low mass so as to fit within the physical volume of the slider body 444 and yet sufficiently large to direct a full cross section of the linearly polarized outgoing and reflected laser beams 291 and 292 so that minimal power is lost and significant distortion and aberrations in the linearly polarized outgoing and reflected laser beams 291 and 292 are not introduced. In the preferred embodiment, the objective optics 446 is a microlens with a numerical aperture (NA) of approximately 0.62. The microlens preferably focuses the optical spot 448 with a full width at half-maximum intensity (FWHM) of approximately 0.57 um +/−2% at a point approximately 200 nm below the air bearing surface 447 of the slider body 444.

In the preferred embodiment, the magnetic coil 460 is a small multi-turn coil positioned near the air-bearing surface 447. In the preferred embodiment, magnetic coil 460 generates a magnetic field which is approximately 300 Oersteds of either polarity and reversible (80% +/−full strength) in a time of 4 ns. The magnetic field is preferably perpendicular to the plane of the spinning MO disk 107 (+/−15 degrees). Preferably, the magnetic coil 460 should not interfere with the linearly polarized outgoing and reflected laser beams 291 and 292 as the beams pass through the MO head 106 to the spinning MO disk 107, or vice versa.

In the preferred embodiment, movement of the MO head 106 and, consequently, movement of the focused optical spot 448 across the spinning MO disk 107 is used in storage and retrieval of information, track following, and short seeks from one data track to another data track. Those skilled in the art will recognize that in the preferred embodiment, track following may be accomplished by using combined coarse and fine tracking servo techniques. For example, a sampled sector servo format may be used to define tracks. The servo format may include either embossed pits stamped into the spinning MO disk 107 or magnetic domain orientations that are read similar to data marks. If embossed pits are used, those skilled in the art will recognize that the differential output circuit 237 (FIG. 2) should be supplemented with an adder output circuit.

In an alternative embodiment, a linearly adjustable optical element 495 may be included in the optical path (between the single-mode PM optical fiber 108 and the reflective surface 445) to optically alter the linearly polarized outgoing laser beam 291 as it exits the single-mode PM optical fiber 108, permitting the optical spot 448 to be focused to include exemplary focal positions 486, 487, and 488. Accordingly, in the aforementioned alternative embodiment, an MO disk 107 that is a multi-layer MO disk may be used. Those skilled in the art will recognize that in the aforementioned alternative embodiment, the linearly adjustable optical element 495 may be positioned by a linear micro-machined motor or a piezoelectric transducer (not shown).

Those skilled in the art will recognize that the single-mode PM optical fiber 108 functions as an aperture of a confocal optical system that has a high depth resolution along its optical axis and an improved transverse resolution. The improved transverse resolution improves the detection of smaller magnetic domain orientations as well as detection of magnetic domain edges as compared to a non confocal system. The high depth resolution minimizes cross-talk between closely spaced surface recording layers when using multi-layer storage media. Another advantage that arises from the confocal nature of the present invention is that stray light reflected from the objective optics 446 is filtered, consequently, anti-reflection coatings on surfaces of the objective optics 446 may not necessarily be required.

Figure 5:
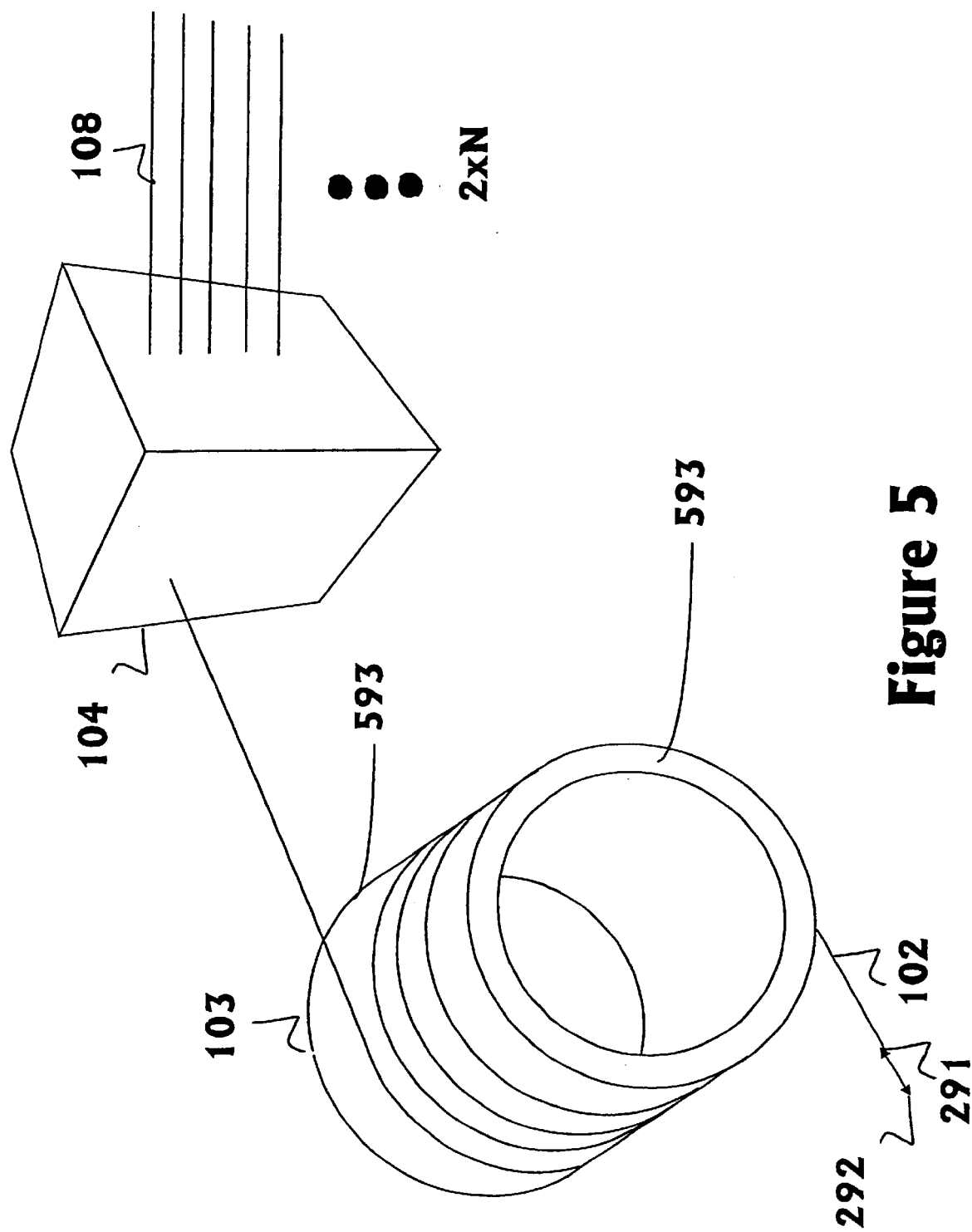
FIG. 5 is a diagram showing a phase compensator used in a representative optical path.

FIG. 5 is a diagram showing a phase compensator used in a representative optical path. Those skilled in the art will recognize that the set of optical paths of the present invention may be illustrated by reference to a single representative optical path, which is shown in FIG. 5 to include: the single-mode PM optical fiber 102, the phase compensator 103, the optical switch 104, and one of the set of single-mode PM optical fibers 108.

In the preferred embodiment, the representative optical path may be subject to external and/or internal stresses, for example, stresses resulting from: mechanical motion, temperature, and pressure. The stresses may originate externally and/or internally and consequently affect an inherent birefringence of the single-mode PM optical fibers 102 and 108. Those skilled in the art will recognize that changes in the birefringence of the single-mode PM optical fibers 102 and 108 may result in variations in the two orthogonal polarization components of the linearly polarized reflected laser beam 292 as it propagates along the optical path, causing phase variations to occur between the two orthogonal polarization components of the reflected laser beam 292. Consequently, unless the changes in the birefringence are accounted for, the two orthogonal polarization components sensed by the photo-diodes 236 and converted to the signal 294 may incorrectly represent the information embodied in the polarization rotation of the linearly polarized reflected laser beam 292.

In the preferred embodiment, the electrical signal 294 is sensed by closed loop servo feedback electronics (not shown). Those skilled in the art will recognize that the servo feedback electronics may include detection, signal processing, and amplification circuits that are well known in the art. Preferably the servo feedback electronics senses variations in the electrical signal 294 and converts the signal into a feedback signal for application to electrodes/wires 593 of the phase compensator 103. The feedback signal functions to excite the phase compensator 103 so as to induce in the phase compensator a dimensional change in a radial direction. The change of shape functions to stretch the single-mode PM optical fiber 102, thereby applying a stress to the single-mode PM optical fiber 102. The applied stress varies the inherent birefringence of the single-mode PM optical fiber 102, preferably in a manner to oppose the aforementioned internal and external stresses. Those skilled in the art will recognize that phase compensator 103 may be preferably excited so as to induce an initial radial expansion, creating a bias point about which phase shifts in the optical path may be induced to occur in both positive and negative directions. Accordingly, the two orthogonal polarizations of the reflected laser beam 292 are preferably maintained with minimized variations.

In the preferred embodiment, phase compensator 103 is a lead zirconate titanate C5400 compound manufactured by Channel Industries (Santa Barbara, Calif.) as a cylindrical shell that includes: an outer diameter of 1 inch, an inner diameter of 0.61 inches, and a thickness of 0.125 inches. In the preferred embodiment, 1–50 turns of single-mode PM optical fiber 102 are attached around the circumference of the phase compensator 103 with an ultraviolet-curing epoxy or similar adhesive. In the exemplary embodiment, single-mode PM optical fiber 102 is of a type HB600, number AD045-01 optical fiber manufactured by FiberCore Ltd., Epsilon House, Enterprise Road, Chilworth Research Centre, Southampton, Hampshire SO16 7NS, England. In the exemplary embodiment single-mode PM optical fibers 102 and 108 have a cladding diameter of 125 um, a core diameter of 3.0 um, and a mode field diameter of 3.2 um, a numerical aperture equal to 0.18, an attenuation 11.5 db/km @633 nm, a cutoff wavelength of 546 nm, and a beat length of 1.5 nm @633. In the preferred embodiment, the electrodes/wires 593 are attached to flat ends of phase compensator 103 so as to reduce capacitance between the electrodes/wires 593, and the feedback signal applied to the electrodes/wires 593 is a varying voltage between 0–1000 volts. Those skilled in the art will recognize that in other embodiments phase compensator 103 may comprise other geometries (i.e., plates, tubes, rings, and disks) and other compositions. Additionally, those skilled in the art will recognize that single-mode PM optical fibers 102 and 108 may comprise other physical properties, dimensions, and other than 1–50 turns. Consequently, those skilled in the art will recognize that other voltages may be required at electrodes/wires 593 to induce a desired radial expansion in phase compensator 103.

Figure 6:
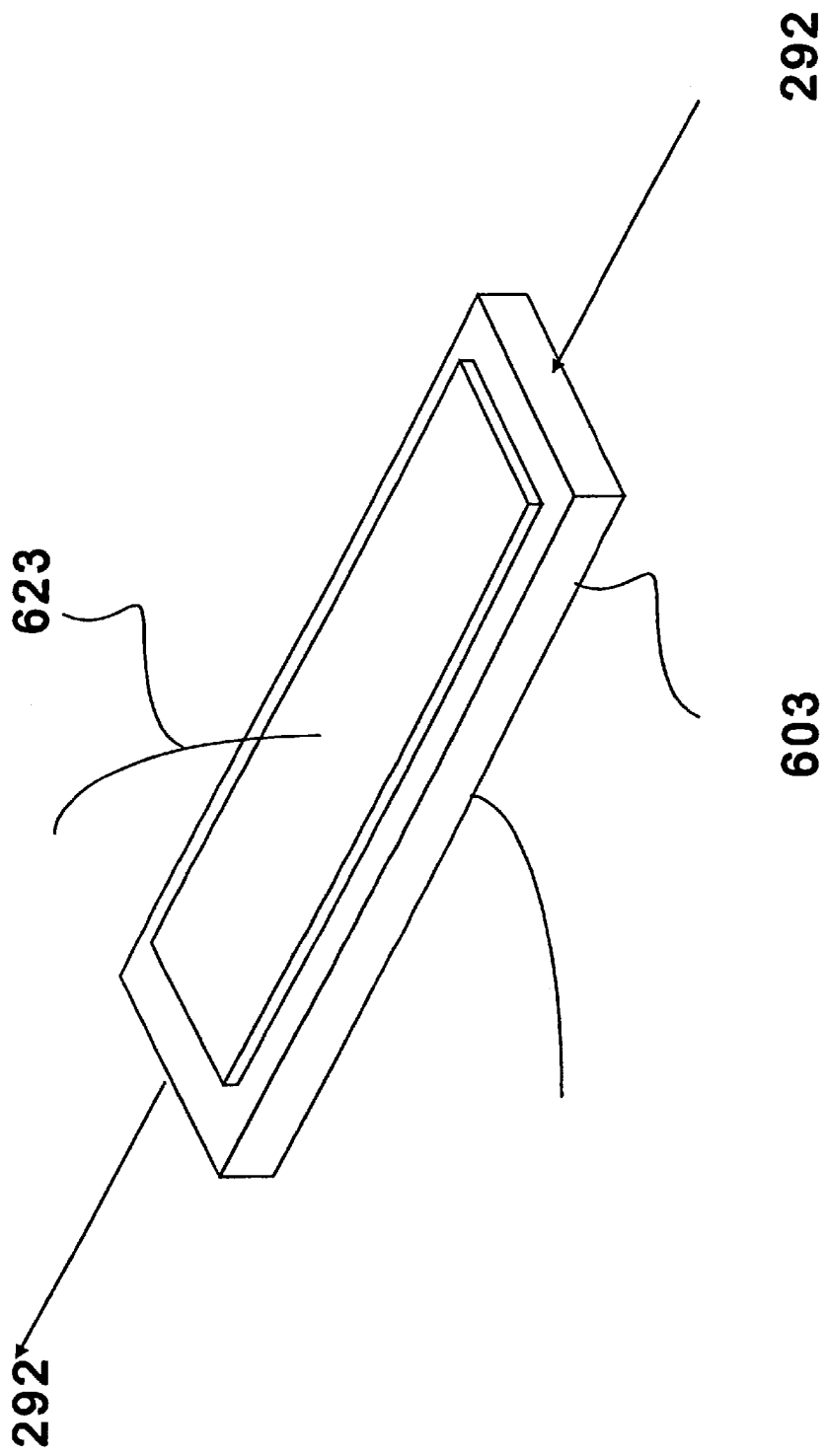
FIG. 6 is a diagram showing a phase compensator in an alternative embodiment.

FIG. 6 is a diagram showing a phase compensator in an alternative embodiment. In an alternative embodiment, phase compensator 603 may include a birefringent electro-optical material such as: an inorganic crystal of lithium niobate, a liquid crystal, or an electro-optic polymer. These materials may be used in bulk or wave-guide form so as to achieve the desired phase compensation characteristics. For example, in the alternative embodiment, the phase compensator 603 may include a lithium niobate transverse electro-optic material that is manufactured by Deltronic Crystal Industries Inc., Dover, N.J. In the alternative embodiment, the phase compensator 603 is a rectangular block dimension of 2 mm(height)×2 mm(width)×20 mm(transverse length) with a set of electrodes/wires 623 attached along a transverse length of the rectangular block, as shown in FIG. 6. In the aforementioned alternative embodiment, the phase compensator 603 is preferably positioned between the half wave plate 238 and the polarizing beam splitter 239, such that, linearly polarized reflected laser beam 292 is directed through the phase compensator 603 in the transverse length. Those skilled in the art will recognize that the birefringent refractive index of phase compensator 603 may be selectively changed by applying a varying voltage at electrodes/wires 623. The electro-optically induced phase changes will be understood by those skilled in the art to be proportional to the applied voltage times the transverse length of the phase compensator 603. Thus, a longer transverse length permits a lower driving voltage to be applied at electrodes/wires 623, which in the alternative embodiment may preferably be between approximately 50 and 100 volts.

Alternatively, phase compensation may be provided by the laser source 231. For instance, those skilled in the art will recognize that the phase shift between the two orthogonal polarization modes of the linearly polarized reflected laser beam 292 is a function of a wavelength of the linearly polarized reflected laser beam 292. Thus, a laser source that can vary a wavelength, such as a distributed feedback laser (DFB) of a type that is well known in the art, may be used in place of the aforementioned phase compensators 103 and 603 to provide the phase compensation functions previously described.

Figure 7:
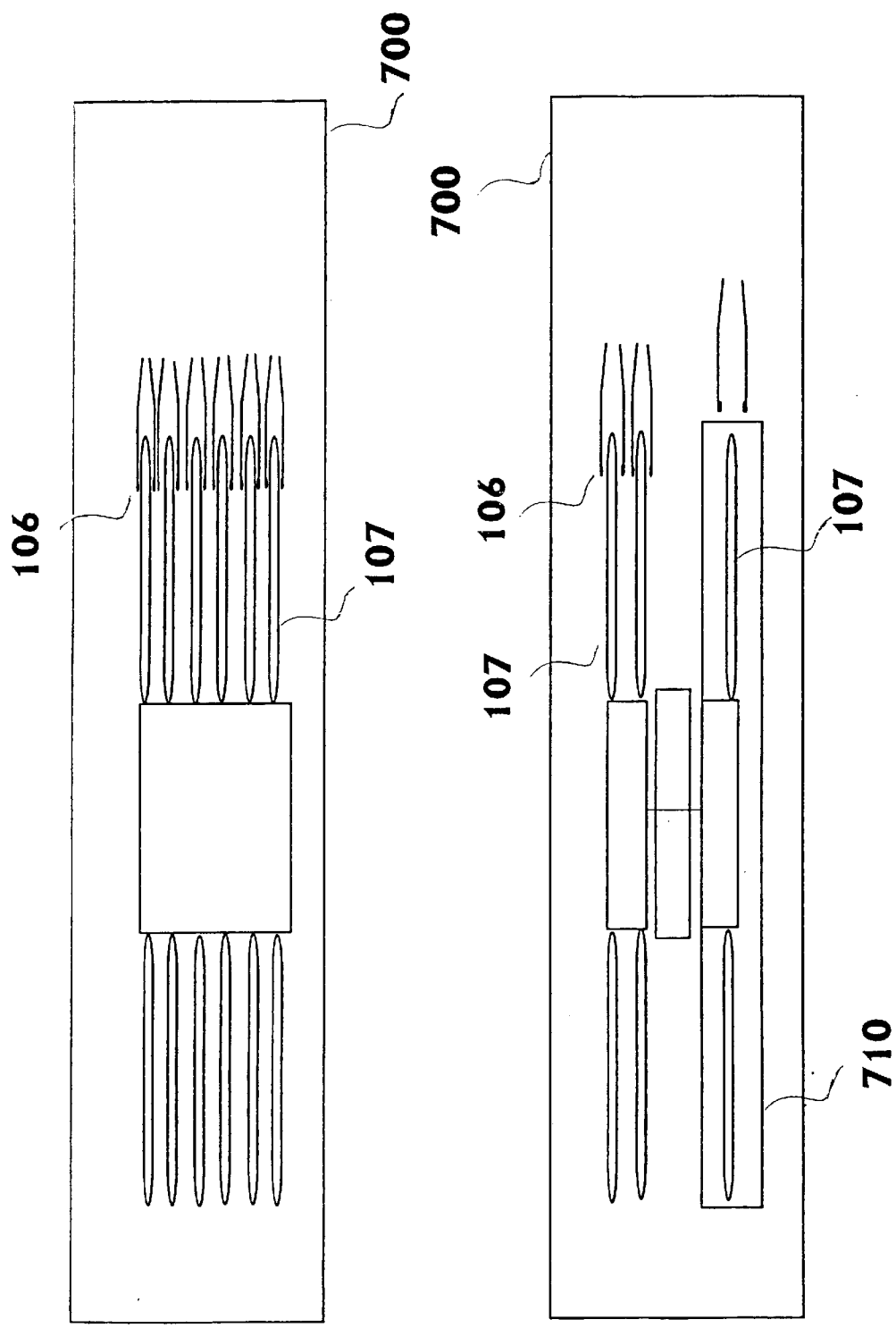
FIG. 7 is a diagram showing a magneto-optical data storage and retrieval system as part of a magneto-optical disk drive.

FIG. 7 is a diagram showing a magneto-optical data storage and retrieval system as part of a magneto-optical disk drive. In the preferred embodiment, the present invention is used in a compact high-speed and high-capacity MO disk drive 700 that is an industry standard half-height form factor and that includes: six 5.25 inch internal spinning MO disks 107 and twelve flying MO heads 106. In the preferred embodiment, the MO disk drive 700 further includes: the single-mode PM optical fiber 102, the optical switch 104, twelve single-mode PM optical fibers 108, and the phase compensator 103. Those skilled in the art will recognize that by eliminating a prior art requirement for including on each of the flying MO heads a plurality of phase compensation elements and multiple single-mode PM optical fibers, the MO disk drive 700 may contain a higher volumetric storage density than permitted in an equivalent volume of the prior art. Those skilled in the art will additionally recognize that the optical paths formed by the single-mode PM optical fiber 102 and individual optical fibers 108 function as a set of low profile and low mass optical paths, enabling MO disk drive 700 to access information faster and more efficiently than the prior art.

In an alternative embodiment, the half-height form factor (1.625 inch) MO disk drive 700 may include a removable MO disk cartridge portion 710 and two fixed internal spinning MO disks 107. By providing the removable MO disk cartridge portion 710, the fixed internal and removable combination permits external information to be efficiently delivered to the MO disk drive 700 for subsequent transfer to the internal spinning MO disks 107. The copied information may, subsequently, be recorded back onto the removable MO disk cartridge portion 710 for distribution to other computer systems. In addition, the removable MO disk cartridge portion 710 allows for very convenient and high speed back-up storage of the internal MO spinning disks 107. The fixed internal and removable combination also permits storage of data files on the removable MO disk cartridge portion 710 and system files and software applications on the internal MO spinning disks 107. In an alternative embodiment (not shown), an MO disk drive 700 may include: any number of spinning MO disks 107 and/or any number of removable MO disk cartridge portions 710.

Although, in the preferred embodiment information is selectively conveyed to and from a laser-optics assembly 101 along an optical path that includes the single-mode PM optical fiber 102 and a selected one of the set of single-mode PM optical fibers 108, those skilled in the art will recognize that in an alternative embodiment that conveys information between a set of individual laser-optics assemblies 101 and a set of respective MO spinning disks 107, optical paths comprising a respective set of continuous single-mode PM optical fibers could be used. Accordingly, in the aforementioned alternative embodiment, the optical switch 104 would not necessarily be required. Those skilled in the art will also recognize that optical transmission of laser light along the optical path that comprises single-mode PM optical fiber 102 may instead use free-space optical transmission between optical-switch 104 and laser-optics assembly 101. Accordingly, in the aforementioned variation, phase compensation may be provided by coupling a respective phase compensator 103 to each of the set of single-mode PM optical fibers 108. Those skilled in the art will recognize that the present invention does not necessarily require use of rotary actuator arms, for example, linear actuator arms may be used. Additionally, those skilled in the art will recognize that the low profile optical paths disclosed by the present invention may be used to convey information to and from the spinning MO spinning disks 107 without necessarily requiring inclusion of the objective optics 446 and/or reflective surface 445 (FIG. 4), such as in an optical path that directly accesses information from a spinning MO disk 107 at a distal end of a single-mode PM optical fiber. Accordingly, those skilled in the art will recognize that in routing single-mode PM optical fiber 102 and/or the single-mode PM optical fiber 108, the bend diameter of the single-mode PM optical fiber 102 and/or single-mode PM optical fibers 108 should preferably be maintained greater than a few hundred times the optical fiber's cladding diameter to minimize long-term bending stress degradation.

Those skilled in the art will also recognize the present invention is not necessarily limited to use with flying head technology. While the present invention is described as being used in an MO disk drive 700, those skilled in the art will recognize that use of optical fiber technology, as described with reference to FIGS. 1–7, is applicable to information transfer using other technologies, including compact disks (CDs), digital video disks (DVD), and communication systems. Those skilled in the art will recognize that phase compensation of the optical paths disclosed by the present invention may not be required in data storage and retrieval systems that do not require use of single-mode PM optical fibers, for example, as in a phase change media optical system. Additionaly, those skilled in the art will recognize that single-mode PM optical fiber technology may be used without necessarily requiring a phase compensator, such as in a data storage and retrieval system that subjects single-mode PM optical fibers to minimal stresses.

Accordingly, those skilled in the art will recognize that the present invention may be practiced in many different environments and many different embodiments and should be limited only by the scope of the ensuing claims.

What is claimed is:

1. An optical system for transmission of light between a source and a magneto-optical storage location, said optical system comprising:

an optical path, wherein said optical path comprises a single optical fiber and a second optical fiber, wherein said single optical fiber comprises a proximal end and a distal end, wherein from said source comprising said single optical fiber receives at said proximal end of said single optical fiber said light, wherein said single optical fiber directs said light to exit said distal end; wherein said second optical fiber is positioned in said optical path;

an assembly, where said assembly is coupled to said optical path, wherein said optical path is positioned by said assembly so that said light exists said distal end of said single optical fiber so as to impinge on said magneto-optical storage location, wherein said optical path is further positioned so as to receive at said distal end of said single optical fiber a reflection of said light from said magneto-optical storage location, and wherein said single optical fiber directs said reflected light to exit said proximal end of said single optical fiber.

2. The optical system as recited in claim 1, further comprising an optical switch, wherein said optical switch is positioned in said optical path between said single optical fiber and said second optical fiber.

3. An optical system for transmission of light between a source and a magneto-optical storage location, said optical system comprising:

an optical path, wherein said optical path comprises a single optical fiber, wherein said single optical fiber comprises a proximal end, a distal end and a single-mode polarization maintaining optical fiber, wherein said single-mode polarization maintaining optical fiber comprises a refractive index, whereby a variation in said refractive index creates a variation in said light, wherein from said source said single optical fiber receives at said proximal end of said single optical fiber said light, and wherein said single optical fiber directs said light to exit said distal end; and an assembly, where said assembly is coupled to said optical path, wherein said optical path is positioned by said assembly so that said light exists said distal end of said single optical fiber so as to impinge on said magneto-optical storage location, wherein said optical path is further positioned so as to receive at said distal end of said single optical fiber a reflection of said light from said magneto-optical storage location, and wherein said single optical fiber directs said reflected light to exit said proximal end of said single optical fiber.

4. The optical system as recited in claim 3, further comprising a dynamic compensator, wherein said compensator is coupled with said optical path so as to minimize said variation in said refractive index.

5. The optical system as recited in claim 4, wherein said dynamic compensator is positioned in said optical path between said proximal end and said distal end of said single optical fiber.

6. The optical system as recited in claim 5, wherein said dynamic compensator applies a force to said single optical fiber and, wherein said force is a function of said variation in said refractive index.

7. The optical system as recited in claim 6, wherein said single optical fiber encircles said dynamic compensator.

8. The optical system as recited in claim 7, wherein said assembly comprises a rotary actuator arm.

9. The optical system as recited in claim 4, wherein said assembly further comprises a flying magneto-optical head, and wherein said distal end of said single optical fiber is coupled to said magneto-optical head.

10. The optical system as recited in claim 9, wherein said reflected light passes through said dynamic compensator after exiting said proximal end of said single optical fiber.

11. The optical system as recited in claim 4, wherein said dynamic compensator comprises an electro-optical material.

12. The optical system as recited in claim 11, wherein said reflected light passes through said dynamic compensator after exiting said proximal end of said single optical fiber.

13. The optical system as recited in claim 4, wherein said dynamic compensator comprises a piezo-electric material.

14. An optical system for transmission of light between a source and a magneto-optical storage location, said optical system comprising:

an optical switch wherein said optical switch is positioned in said optical path, wherein said magneto-optical storage location comprises at least one storage disk, wherein said assembly comprises a set of movable arms;

an optical path, wherein said optical path comprises a single optical fiber, wherein said single optical fiber comprises a proximal end, a distal end, wherein from said source said single optical fiber receives at said proximal end of said single optical fiber said light, and wherein said single optical fiber directs said light to exit said distal end; and a set of second optical fibers, wherein each of said set of second optical fibers comprises a respective proximal end and a respective distal end, wherein said optical switch positioned in said optical path is coupled to said single optical fiber, wherein said optical switch receives said light exiting said distal end of said single optical fiber is routed by said optical switch to selectively enter a one of said set of second optical fibers at said respective proximal end, wherein said light entering said respective proximal end of said one of said set of second optical fibers is directed by said one of said set of optical fibers to exit said respective distal end, wherein said respective distal end is coupled to a respective one of said set of movable arms, wherein said one of said set of second optical fibers is positioned by said respective one of said set of movable arms such that said light exiting said respective distal end of said one of said set of second optical fibers is directed onto a one of said at least one rotating storage disk, wherein said one of said set of second optical fibers is further positioned by said respective one of said set of movable arms to receive said reflected light at said respective distal end of said one of said set of second optical fibers, wherein said reflected light is directed by said one of said set of second optical fibers to exit a respective proximal end of said one of said set of second optical fibers, and wherein said reflected light exiting said respective proximal end of said one of said set of second optical fibers is selectively routed by said optical switch to enter said distal end of said single optical fiber; and an assembly, where said assembly is coupled to said optical path, wherein said optical path is positioned by said assembly so that said light exists said distal end of said single optical fiber so as to impinge on said magneto-optical storage location, wherein said optical path is further positioned so as to receive at said distal end of said single optical fiber a reflection of said light from said magneto-optical storage location, and wherein said single optical fiber directs said reflected light to exit said proximal end of said single optical fiber.

15. The optical system as recited in claim 14, wherein said optical path comprises a DFB laser source.

16. The optical system as recited in claim 15, wherein said single optical fiber and said set of second optical fibers comprise single-mode polarization maintaining optical fibers.

17. The optical system as recited in claim 16, wherein said reflected light passes through a dynamic compensator after exiting said proximal end of said one of said set of second optical fibers.

18. The opical system as recited in claim 17, wherein said dynamic compensator applies a force to said single optical fiber, and wherein said force is a function of said variation in said light.

19. The optical system as recited in claim 18, wherein said compensator applies a force to said single optical fiber, and wherein said force is a function of said variation in said light.

20. The optical system as recited in claim 14, wherein said at least one storage disk is removable from said optical system.

21. The optical system as recited in claim 14, wherein said at least one rotating storage disk comprises at least six storage disks, and wherein said at least six storage disks are positioned within a half-height format factor.

22. The optical system as recited in claim 14, wherein said optical system further comprises a set of flying magneto-optical heads, wherein said set of flying magneto-optical heads are coupled to said respective distal end of said set of second optical fibers so that said light exiting said respective distal end of said one of said set of second optical fibers passes through a respective one of said set of flying magneto-optical heads and so that said reflected light passes through said respective one of said set of flying magneto-optical heads so as to enter said respective distal end of said one of said set of second optical fibers.

23. An optical system for transmission of light between a source and a set of magneto-optical storage disks, wherein said optical system comprises:
an optical switch;
a single optical fiber, wherein said single optical fiber comprises a proximal end and a distal end, wherein said single optical fiber receives said light at said proximal end and directs said light to exit said distal end;
a set of arms; and
a set of second optical fibers, wherein each of said set of second optical fibers comprises a respective proximal end and a receptive distal end, wherein said optical switch is coupled to said single optical fiber so as to receive said light exiting said distal end of said single optical fiber, wherein said light exiting said distal end of said single optical fiber is selectively routed by said optical switch so as to enter a one of said set of second optical fibers at said respective proximal end, wherein said light entering said respective proximal end of said one of said set of second optical fibers is directed by said one of said set of second optical fibers so as to exit said respective distal end, wherein said respective distal end is coupled to a respective one of said set of arms and is positioned by said respective one of said set of arms such that said light exiting said respective distal end of said one of said set of second optical fibers is directed onto a one of said set of storage disks, wherein said respective distal end of said one of said set of second optical fibers is further positioned by said respective one of said set of arms to receive said light as a reflected light from said one of said set of storage disks, wherein said reflected light is directed by said one of said set of second optical fibers to exit a respective proximal end of said one of said set of second optical fibers, and wherein said reflected light exiting said respective proximal end of said one of said set of second optical fibers is selectively routed by said optical switch so as to enter said distal end of said single optical fiber and so as to exit said proximal end of said single optical fiber.

24. The optical system as recited in claim 23, further comprising a compensator dynamic, wherein after exiting said respective proximal end of said one of said set of second optical fibers said reflected light passes through said compensator.

25. The optical system as recited in claim 23, further comprising a dynamic compensator, wherein said dynamic compensator is coupled to said single optical fiber between said proximal end and said distal end of said single optical fiber.

26. An optical storage system for transmission of light between a source and a destination, said optical system comprising:
an optical coupler, said optical coupler directing said light; and
a dynamic compensator, said dynamic compensator altering an optical property of said coupler in response to a variation in said light.

27. The optical storage system as recited in claim 26, wherein said optical coupler comprises a single-mode polarization maintaining optical fiber.

28. The optical system as recited in claim 26, wherein said optical coupler comprises an electro-optical material.

29. A method of transmission of light, comprising the steps of:
directing said light along an optical path, wherein said optical path comprises an optical fiber, wherein said optical fiber comprises a proximal end and a distal end;
positioning said optical path so as to direct said light so as to enter said proximal end of said optical fiber and to exit said distal end of said optical fiber;
positioning said optical path to direct a reflection of said light so as to enter said distal end of said optical fiber; and
dynamically compensating said optical path for a variation in said light, wherein said step of compensating occurs at a point in said optical path before said light from said source exits said distal end of said optical fiber.

30. The method of transmission of light as recited in claim 29, wherein said step of directing said light comprises directing said light through a single-mode polarization maintaining optical fiber.

31. The method of transmission of light as recited in claim 30, wherein said step of positioning said optical path further comprises positioning said optical path so as to direct said light through a magneto-optical head onto a rotating magneto-optical storage medium; and
wherein said step of positioning said optical path further comprises positioning said optical path to receive said reflection of said light through said magneto-optical head and at said distal end of said single optical fiber.

32. The method of transmission of light as recited in claim 29, wherein said step of dynamically compensating further comprises applying a force to said optical fiber.

33. The method as recited in claim 29, wherein said variation in light is a function of a polarization of said light.

34. A single-mode polarization maintaining optical fiber used for storage and retrieval of information in a magneto-optical system, said optical fiber comprising:
a proximal end and a distal end, said optical fiber receiving said information at said proximal end, wherein said information is conveyed by said single optical fiber to exit said distal end onto a storage location, wherein said distal end of said optical fiber receives from said storage location said information, wherein said single optical fiber directs said information to exit said proximal end, and wherein after exiting said proximal end said information passes through a dynamic compensator.

35. A single-mode polarization maintaining optical fiber used for storage and retrieval of information in a magneto-optical system, said optical fiber comprising:

a proximal end and a distal end, wherein said optical fiber receives said information at said proximal end, wherein said information is conveyed by said single optical fiber to exit said distal end onto a storage location, wherein said distal end of said optical fiber receives from said storage location said information, wherein between said distal end and said proximal end said single optical fiber is coupled to a dynamic compensator.

36. An optical system for transmission of light between a source and a magneto-optical storage location, said optical system comprising:

an optical path, wherein said optical path comprises a plurality of optical fibers, wherein each of said plurality of optical fibers comprises a respective proximal end and a respective distal end; and an optical switch, wherein said optical switch is positioned in said optical path for routing, for routing said light from said source to selectively enter a one of said set of second optical fibers at said respective proximal end, wherein said light entering said respective proximal end of said one of said set of second optical fibers is directed by said one of said set of optical fibers to exit said respective distal end, wherein said light exiting said respective distal end of said one of said set of second optical fibers is directed onto said magneto-optical storage location, wherein said one of said set of second optical fibers receives said reflected light at said respective distal end of said one of said set of second optical fibers, wherein said reflected light is directed by said one of said set of second optical fibers to exit a respective proximal end of said one of said set of second optical fibers, and wherein said reflected light exiting said respective proximal end of said one of said set of second optical fibers is selectively routed by said optical switch.

37. An optical system for transmission of light between a source and a magneto-optical storage location, said optical system comprising:

an optical path, wherein said optical path comprises said source and a single optical fiber, wherein said source includes a DFB laser, wherein said single optical fiber comprises a proximal end, a distal end and a refractive index, whereby a variation in said refractive index creates a variation in said light, wherein from said source said single optical fiber receives at said proximal end of said single optical fiber said light, and wherein said single optical fiber directs said light to exit said distal end; and an assembly, where said assembly is coupled to said optical path, wherein said optical path is positioned by said assembly so that said light exists said distal end of said single optical fiber so as to impinge on said magneto-optical storage location, wherein said optical path is further positioned so as to receive at said distal end of said single optical fiber a reflection of said light from said magneto-optical storage location, and wherein said single optical fiber directs said reflected light to exit said proximal end of said single optical fiber.

38. An optical system for transmission of light between a source and a magneto-optical storage location, said optical system comprising:

an optical path, wherein said optical path comprises a single optical fiber, wherein said single optical fiber comprises a proximal end, a distal end, wherein from said source said single optical fiber receives at said proximal end of said single optical fiber said light, and wherein said single optical fiber directs said light to exit said distal end;

an assembly, where said assembly is coupled to said optical path, wherein said optical path is positioned by said assembly so that said light exists said distal end of said single optical fiber so as to impinge on said magneto-optical storage location, wherein said optical path is further positioned so as to receive at said distal end of said single optical fiber a reflection of said light from said magneto-optical storage location, and wherein said single optical fiber directs said reflected light to exit said proximal end of said single optical fiber; and a dynamic compensator, wherein said dynamic compensator is coupled with said optical path, and wherein said compensator is responsive to a variation in said light so as to minimize said variation is said light.

* * * * *

UNITED STATES PATENT AND TRADEMARK OFFICE
CERTIFICATE OF CORRECTION

PATENT NO. : 5,940,549

DATED : August 17, 1999

INVENTOR(S) : Jeffrey P. Wilde, Joseph E. Davis, Jerry E. Hurst, Jr., John F. Heanue and Jeff Drazan It is certified that error appears in the above-identified patent and that said Letters Patent is hereby corrected as shown below:

Inventors: Replace "Jeffery" with --Jeffrey--.

Column 10, line 56, delete "comprising".

Column 10, line 61, after "path;" insert --and--.

Signed and Sealed this

Twenty-fifth Day of April, 2000

Attest:

Q. TODD DICKINSON

*Attesting Officer*  *Director of Patents and Trademarks*